United States Patent
Johnson

(10) Patent No.: US 6,473,597 B1
(45) Date of Patent: *Oct. 29, 2002

(54) METHOD AND APPARATUS FOR MODELING TRANSMITTER BANDWIDTH FOR TELECOMMUNICATIONS ANALYSIS

(76) Inventor: Thomas M. Johnson, 112 Muirfield Dr., Royersford, PA (US) 19468

( * ) Notice: Subject to any disclaimer, the term of this patent is extended or adjusted under 35 U.S.C. 154(b) by 0 days.

This patent is subject to a terminal disclaimer.

(21) Appl. No.: 09/547,602

(22) Filed: Apr. 12, 2000

(51) Int. Cl.$^7$ .............................. H04B 1/10; H04B 15/00
(52) U.S. Cl. ...................... 455/63; 455/39; 455/67.1; 455/115; 455/12.1; 455/427; 370/241; 370/468
(58) Field of Search ........................ 455/12.1, 39, 427, 455/67.1, 115, 63; 370/468, 241

(56) References Cited

U.S. PATENT DOCUMENTS

| | | | |
|---|---|---|---|
| 4,339,828 A | | 7/1982 | Chasek ........................ 455/205 |
| 4,734,856 A | | 3/1988 | Davis .......................... 364/300 |
| RE32,905 E | | 4/1989 | Baran .......................... 370/104 |
| 5,020,092 A | | 5/1991 | Phillips et al. ................ 379/59 |
| 5,208,829 A | | 5/1993 | Soleimani ...................... 375/1 |
| 5,268,712 A | | 12/1993 | Hilpert et al. ............ 358/192.1 |
| 5,457,811 A | * | 10/1995 | Lemson ..................... 455/67.1 |
| 5,479,447 A | * | 12/1995 | Chow et al. ................ 375/260 |
| 5,548,539 A | | 8/1996 | Vlach et al. ................ 364/578 |
| 5,557,320 A | | 9/1996 | Krebs .......................... 348/12 |
| 5,566,301 A | * | 10/1996 | Koz et al. ................ 395/200.2 |
| 5,621,416 A | | 4/1997 | Lennen ....................... 342/357 |
| 5,638,363 A | | 6/1997 | Gittins et al. ............... 370/358 |
| 5,729,531 A | * | 3/1998 | Raith et al. .................. 370/252 |
| 5,828,695 A | * | 10/1998 | Webb .......................... 375/219 |
| 6,021,268 A | * | 2/2000 | Johnson .................. 395/500.24 |
| 6,041,233 A | * | 3/2000 | Rosati .......................... 455/427 |
| 6,058,147 A | * | 5/2000 | Eklof et al. .................. 375/344 |
| 6,233,439 B1 | * | 5/2001 | Jalali .......................... 455/127 |
| 6,236,833 B1 | * | 5/2001 | Peyrovian .................. 455/12.1 |
| 6,097,929 A1 | * | 8/2001 | Hassall et al. ............. 455/12.1 |

FOREIGN PATENT DOCUMENTS

| | | |
|---|---|---|
| EP | 0 651 531 A2 | 10/1994 |
| EP | 0 731 573 A1 | 9/1996 |
| WO | 92/22162 | 12/1992 |

* cited by examiner

*Primary Examiner*—William Trost
*Assistant Examiner*—Marceau Milord

(57) ABSTRACT

A method and system for the automatic scaling of radio transmitter characteristics. Transmitter designs are subject to change based upon the parameters of receivers and the desired characteristics of communications links in a communications system. The method of the present invention involves automatically scaling certain characteristics of a transmitter based upon other characteristics of the transmitter and the desired characteristics of a communications link. Autoscaling calculates the bandwidth necessary for the transmitter based upon other characteristics of the transmitter, such as modulation type and data rate. Information concerning the modulation type and the scaling factor associated with each modulation type are stored in a database for access by the system. Once these transmitter characteristics are known, further transmitter characteristics, such as bandwidth, are automatically calculated. The system allows for multiple designs to be created so that analysts can select the optimal design for the mission. The system also allows for animated soft copy output of maps, reports and graphs to be created as well as allowing for hard copy output of reports graphs.

21 Claims, 3 Drawing Sheets

METHOD AND APPARATUS FOR MODELING TRANSMITTER BANDWIDTH FOR TELECOMMUNICATIONS ANALYSIS

FIELD OF THE INVENTION

The present invention relates generally to the analysis, design and planning of telecommunications systems. In particular, the invention relates to a method and apparatus to model the bandwidth of a transmitter in a telecommunications link to automatically scale the transmitter bandwidth to take account of variations in its data rate and modulation type.

BACKGROUND OF THE INVENTION

The optimal functioning of a transmitter in a telecommunications system depends upon, among other things, the suitability of the bandwidth of the transmitted signal to its data rate and modulation type. In an analysis of communications links, an incorrect setting of the transmitting bandwidth can lead to erroneous conclusions about transmitter power or receiver requirements. If the transmitter has the bandwidth set too wide, part of the signal will be missed by the receiver causing high bit error rates; if the transmitter bandwidth is too narrow, the receiver will unnecessarily expend resources amplifying and processing noise from the remainder of the transmitter's bandwidth.

In a computer analysis of the communications link between a satellite receiver and a ground transmitter, it may be important to determine how much transmitter power is needed to achieve a given bit error rate. If the bandwidth setting for the transmitter is incorrect, the predicted power requirement may be too low, in which case the communications system may fail because of insufficient power. In contrast, if the predicted power requirement is too high, the transmitter may be burdened with unnecessary weight or shorter operating times resulting from a more powerful transmitter being used.

Alternately, a new Earth Resource satellite, whose mission requires it to transmit a given number of pictures daily to ground-based receivers is to be built. This requires achieving a given data rate, which, in conjunction with the transmitter's modulation type, would determine the optimal bandwidth for the transmitter.

In a computer analysis of these cases, it is desirable to be able to modify and test various transmitter parameters in order to arrive at the most efficient and economical configuration. However, changes in these parameters—e.g., in the modulation type—require corresponding changes in the transmitting bandwidth. If the latter changes are not made, the analysis will result in errors with potentially expensive consequences. If a satellite with insufficient transmitter power is launched, the error cannot be corrected and the satellite will be useless for its intended purpose.

In a communications link analysis without the present invention, it is necessary to adjust the transmitter's bandwidth setting each time there is a change in the transmitter parameters affecting bandwidth ratio. This approach is time consuming and does not allow a wide range of receiver parameters to be tested. More seriously, reliance on such an approach entails a significant risk of error.

To overcome the shortcomings of the above approach, a method and apparatus are needed that will adjust the bandwidth setting of the transmitter in a computer analysis of communications links automatically taking into account the changes in parameters affecting bandwidth ratio. Such a method and apparatus will provide the user with a bandwidth autoscaling option that can be used in lieu of setting the transmitting bandwidth manually. The autoscaling capability would take into account such transmitter parameters as data rate and modulation type, and set the transmitting bandwidth to the correct frequency range, thereby allowing design of the optimal receiver.

SUMMARY OF THE INVENTION

It is therefore an object of the present invention to provide a method and apparatus to ensure that a transmitter is set to the correct bandwidth, given its data rate and modulation type.

It is a further objective of the present invention to provide method and apparatus to ensure that a transmitter in a computer analysis of telecommunications links among satellites, or between satellites and Earth stations, is set to the correct bandwidth, given its data rate and modulation type.

It is a further objective of the present invention to allow transmitter parameters to be modeled graphically to provide visual feedback to the designer of the parameters chosen.

It is yet another objective of the present invention to provide visual feedback to the designer, in animated form, showing the performance of the receiver and transmitter combination specified.

It is a further objective of the present invention to provide an auto scaling function whereby the correct parameters of the transmitter are created automatically based upon the characteristics of the transmitter in question and other system component characteristics.

In its preferred embodiment, the present invention is a feature of a communications module integrated into an existing computer program for satellite systems analysis. The present invention allows the user to model a satellite systems analysis scenario by using a graphical user interface to specify basic and graphics properties of objects in the scenario (such as satellites, facilities, sensors, targets, etc,) and imposing constraints on those objects. The program presents an animated visual display of the scenario (on a world map window) and provides analysis results in the form of reports and graphs. The communications module adds two further types of objects—receivers and transmitters—to the program and allows the user to model their properties, behavior and limitations.

When analyzing potential receiver/transmitter combinations, the user specifies the basic properties of a transmitter such as bandwidth. The user can set the bandwidth of the transmitter manually or select the Auto Scale option. If the Auto Scale option is selected, the bandwidth of the transmitter is determined automatically by multiplying its data rate by the modulation-specific spectrum efficiency ratio. The spectrum ratio is the required bandwidth per bit per second, given, e.g., in Hz/bps. Thus, the link between each receiver and the transmitter is analyzed as if the transmitter were set for the bandwidth most appropriate to its settings for data rate and modulation type. As a result, one transmitter object in the scenario will have varying bandwidth settings, depending on its settings for data rate and modulation type. This auto scaling ability not only speeds the analysis process, but also eliminates human error.

The present invention operates in on an IBM PC or compatible having at least a Pentium processor with 16 MB of RAM (32 MB recommended) and 220 MB of Disk space. The present invention will also operate on various UNIX platforms such as the Sun/Solaris 2.5, Hewlett Packard UX 10.20, Silicon Graphics IRIX 6.3, DEC Unix 4.0 and higher, and IBM AIX 4.2. The present invention also comprises input and output means so that data can be input to the program specifying the transmitter parameters. The typical input means is a keyboard although other input means such as mouse and voice input are also contemplated.

As previously noted, the output to the analyst can be in the form of a video display including animated maps, reports and graphs, and/or in the form of hard copy. Such hard copy output also includes printouts of maps, reports and graphs.

The equipment of the present invention also comprises logic whereby the scaling of the transmitter based upon the characteristics that affect bandwidth can take place. For example, a database of modulation types is present together with an associated scaling factor. This is used in conjunction with the input of a data rate to calculate the bandwidth necessary for the transmitter.

DETAILED DESCRIPTION OF THE INVENTION

Figure 1:
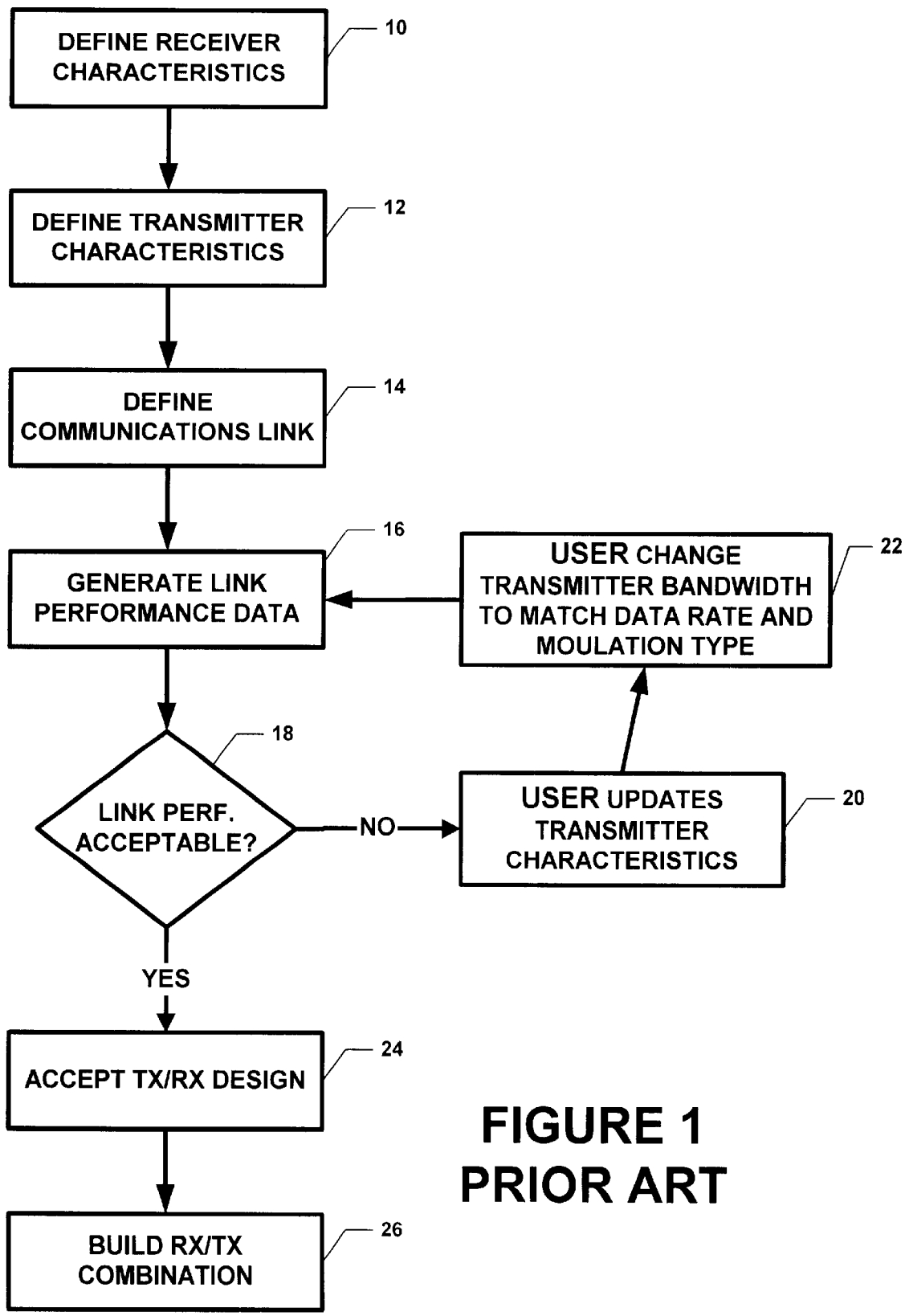
FIG. 1 illustrates the current method of transmitter scaling.

Referring to FIG. 1, the process flow for transmitter bandwidth determination is shown. The user first defines the receiver characteristics 10. Such receiver characteristics include the signal-to-noise ratio required, bandwidth fluctuations and controls, antenna type, noise figure and other factors.

The user next defines the transmitter characteristics 12. These characteristics comprise the power of the transmitter, antenna type and size, miscellaneous gains and losses, modulation type, data rate, and other factors.

After defining receiver and transmitter characteristics, the user defines a communications link from the receiver to the transmitter 14.

After definition of a communications link, the user generates link performance data 16, comprising such information as the signal-to-noise ratio of the link, bit-error-rate and carrier-to-noise ratio based upon receiver, transmitter, and communications link characteristics. This data is then analyzed to determine if the receiver/transmitter combination over the communications link operates as desired 16. Predefined thresholds for the communications link parameters are set.

If performance data is acceptable, the design for the transmitter and receiver is accepted 18. If the link performance is unacceptable, the user must then update the receiver 20 and transmitter characteristics 22.

If the modulation type and/or data rate are changed, it may be necessary for the user to change the transmitter bandwidth accordingly 22. This is based upon a re-calculation of the product of the scaling factors (i.e. the modulation-specific spectrum efficiency factor) and data rate for the transmitter in question. This is a critical step since if the transmitter bandwidth characteristics are not changed or are changed incorrectly, the results and the analysis of the communications link performance will be incorrect. The user then generates link performance data again 16 and again determines if link performance is acceptable 18. If the receiver/transmitter combination is acceptable, the design is accepted 24 and the transmitter/receiver combination is then fabricated 26.

A key difficulty with the existing procedures is that altering the transmitter bandwidth to match changes in other transmitter parameters is not a trivial task. It involves consideration of a number of factors such as communications link factor tradeoffs and receiver characteristics, and shape of the power spectrum of the transmitted signal. If this step is not done correctly, then subsequent results of transmitter/receiver combinations will be incorrect, resulting in costly design and construction difficulties, not to mention a potential compromise of mission objectives.

Figure 2:
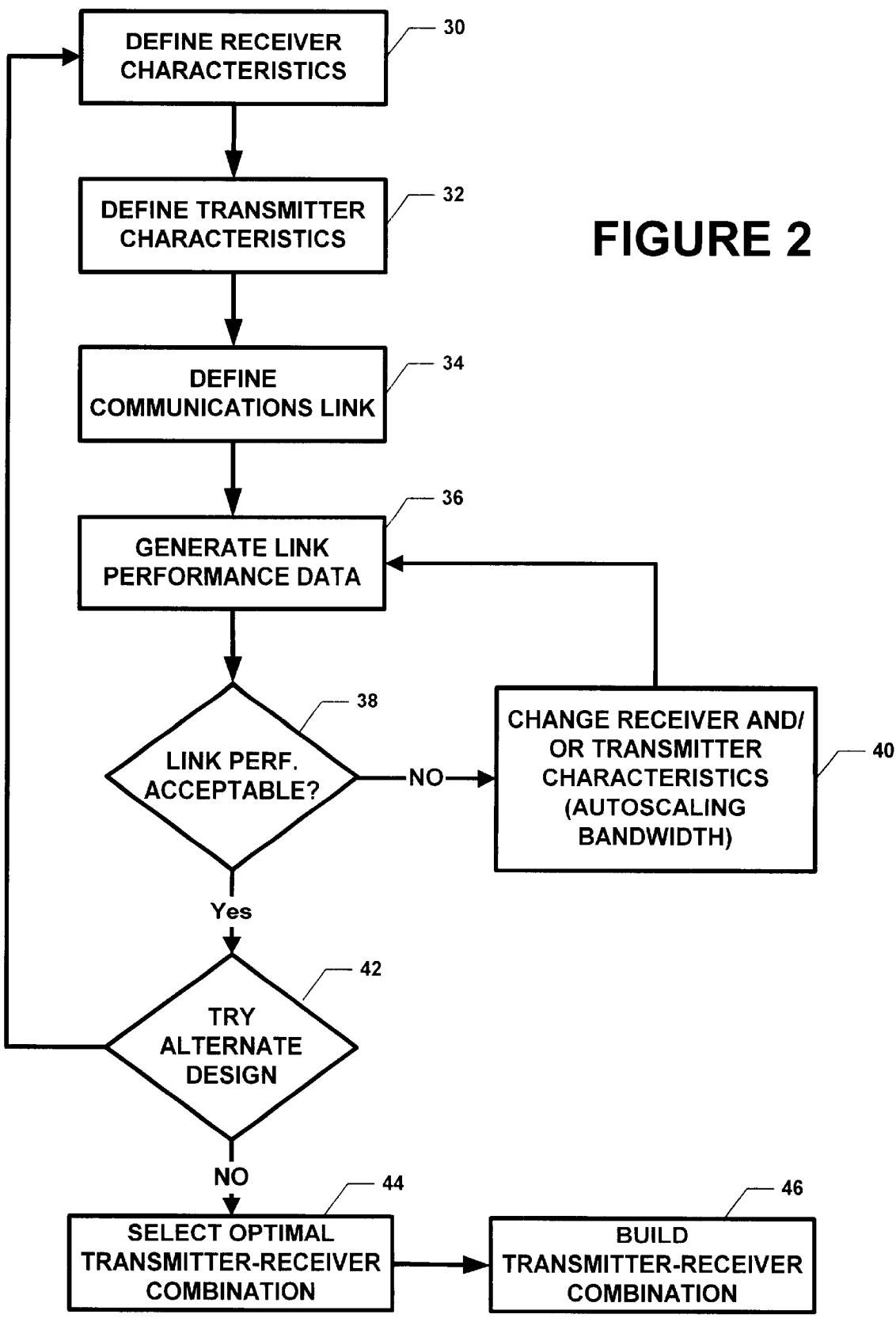
FIG. 2 illustrates the present invention method of transmitter scaling.

Referring to FIG. 2, the process of the present invention is described. The user defines receiver characteristics 30, and defines transmitter characteristics 32 autoscaling the bandwidth of the transmitter on the basis of the transmitter's data rate and modulation type. The user then evaluates the performance of the communications link 34, generating link performance data 36, and determining if the link performance is acceptable 38. If performance is not acceptable, the user updates the receiver and/or transmitter parameters 40, again autoscaling the transmitter's bandwidth to reflect any changes in its data rate and/or modulation type. After making such adjustments, the user reevaluates the communications link performance 36, 38. If the performance data is acceptable 38, the user decides whether to try an alternative transmitter receiver design 42. If the user decides not to try an alternative design, then the user selects from among the designs that have performed acceptably 44 and proceeds to the fabrication phase 46. Following this procedure, the user may experiment with a wide variety of receiver and transmitter parameters in search of the optimal combination, without having to adjust transmitter bandwidth every time there is a change in the transmitter's data rate and/or modulation type. In this way potential errors are avoided.

Figure 3:
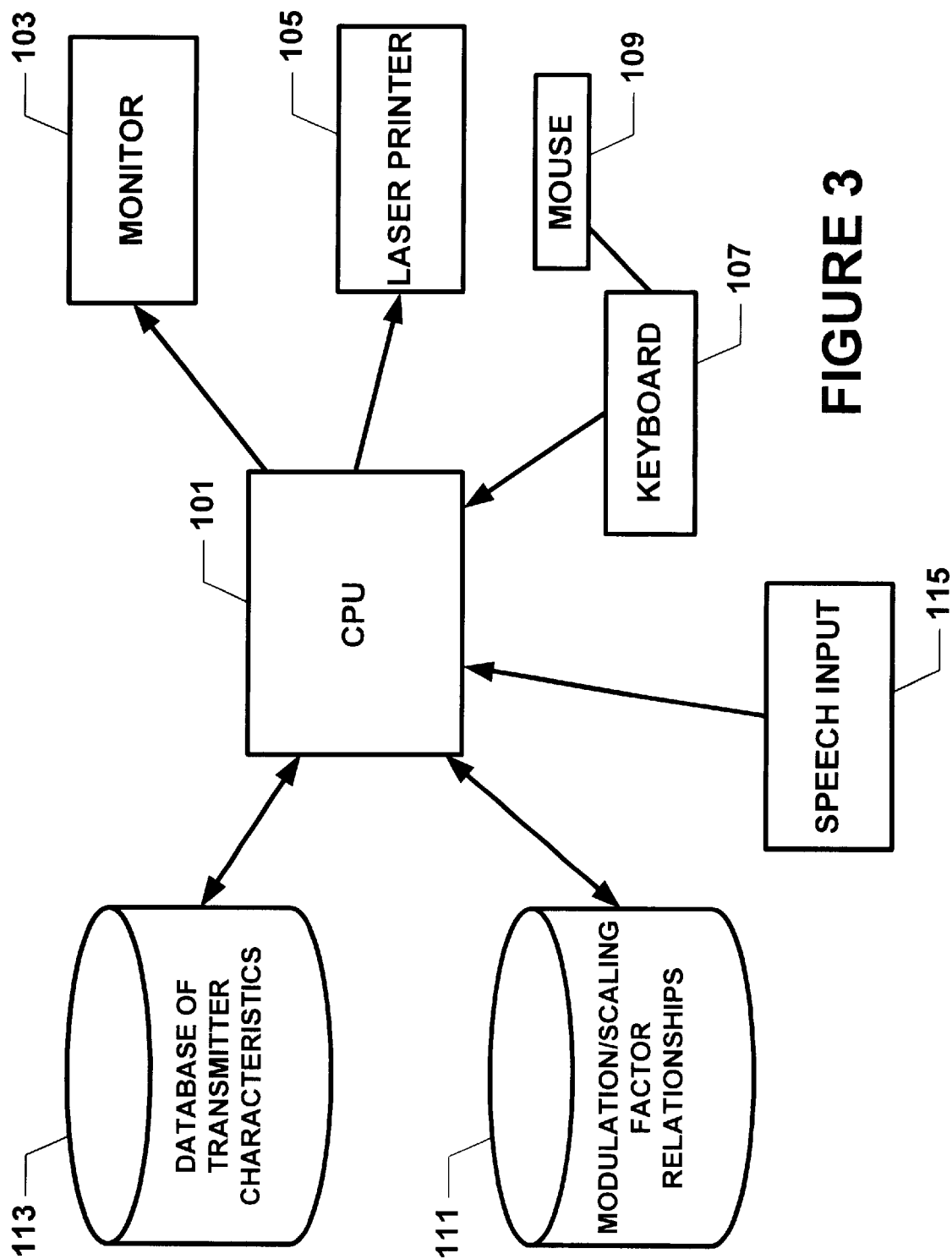
FIG. 3 illustrates the equipment of the present invention.

Referring to FIG. 3, the equipment of the present invention is described. Central processing unit (CPU) 101 comprises RAM memory in which logic may be stored to perform the analysis of the present invention. Instructions concerning the scaling of the transmitter characteristics are executed by the CPU. Using input means typically a keyboard 107 and mouse 109. Characteristics of a transmitter are input. This input can be either in the form of input of specific characteristics manually or as selected characteristics from a database of transmitter characteristics 113. It is also contemplated that speech input and instruction to the computer may also be used 115.

Once the transmitter characteristics are input, the CPU 101 can obtain information on the relationship of modulation type to scaling factor from a database of such relationships 111. Using the scaling factor information from the database 111 and the data rate and modulation type input by the user, the bandwidth of the transmitter can be calculated a by the CPU 101 and output to a video display 103 or to hard copy 105 for further analysis.

A method for autoscaling the parameters of a transmitter based upon communications link requirements and other characteristics of the transmitter has been shown. Although terminology used herein, such as "bit error rate," refer to digital communication, this terminology is not meant to be limiting as the teachings herein are also applicable to analog communication. Those skilled in the art will also appreciate that there are alternatives for the autoscaling of transmitter bandwidth without departing from the spirit of the invention as shown.

I claim:

1. A method for autoscaling transmitter characteristics wherein the method is incorporated into a satellite system analysis computer program for design selection comprising:
   (a) defining certain first transmitter characteristics;
   (b) automatically scaling other first transmitter characteristics based upon the defined first transmitter characteristics;
   (c) defining the communications link between the first transmitter and one or more receivers;
   (d) generating first communication link performance data;
   (e) determining acceptability of the first communications link performance;
   (f) defining second transmitter characteristics when first communication link performance is unacceptable;
   (g) automatically scaling other second transmitter characteristics based upon the defined second transmitter characteristics;
   (h) generating second communications link performance data based upon the second transmitter characteristics;
   (i) determining acceptability of the second communications link performance; and
   (j) accepting the revised transmitter characteristics when link performance data is acceptable.

2. The method for autoscaling transmitter characteristics wherein the method is incorporated into a satellite system analysis computer program for design selection of claim 1 wherein the defined first transmitter characteristics comprise data rate and modulation type.

3. The method for autoscaling transmitter characteristics wherein the method is incorporated into a satellite system analysis computer program for design selection of claim 1 wherein the automatically scaled first transmitter characteristics comprise bandwidth.

4. The method for autoscaling transmitter characteristics wherein the method is incorporated into a satellite system analysis computer program for design selection of claim 1 wherein defining the first communications link comprises defining signal-to-noise ratio, bit error rate, and carrier-to-noise ratio.

5. The method for autoscaling transmitter characteristics wherein the method is incorporated into a satellite system analysis computer program for design selection of claim 1 wherein generating first communications link performance comprises calculating the signal-to-noise ratio, the bit error rate, and the carrier-to-noise ratio of the first communications link using the first transmitter characteristics.

6. The method for autoscaling satellite transmitter characteristics wherein the method is incorporated into a satellite system analysis computer program for design selection of claim 1 wherein determining acceptability of the first communications link performance comprises comparing first communications link performance data to desired thresholds and accepting first transmitter settings when performance thresholds are met and rejecting first transmitter settings when performance thresholds are not met.

7. The method for autoscaling transmitter characteristics wherein the method is incorporated into a satellite system analysis computer program for design selection of claim 1 wherein the defined second transmitter characteristics comprise data rate and modulation type.

8. The method for autoscaling transmitter characteristics wherein the method is incorporated into a satellite system analysis computer program for design selection of claim 1 wherein the automatically scaled second transmitter characteristics comprise bandwidth.

9. The method for autoscaling transmitter characteristics wherein the method is incorporated into a satellite system analysis computer program for design selection of claim 8 wherein the second transmitter bandwidth is calculated by multiplying the scaling factor for the modulation type of the second transmitter by the data rate of the second transmitter.

10. The method for autoscaling transmitter characteristics wherein the method is incorporated into a satellite system analysis computer program for design selection of claim 1 further comprising defining alternative receiver transmitter combinations.

11. The method for autoscaling transmitter characteristics wherein the method is incorporated into a satellite system analysis computer program for design selection of claim 10 further comprising selecting the optimal receiver and transmitter combination.

12. The method for autoscaling transmitter characteristics wherein the method is incorporated into a satellite system analysis computer program for design selection of claim 11 further comprising building the accepted receiver/transmitter combination.

13. A system for autoscaling transmitter characteristics wherein the system is incorporated into a satellite system analysis computer program for design selection comprising:
   input means for specifying transmitter parameters;
   a central processing unit (CPU) connected to the input means for receiving transmitter parameters from the input means;
   random access memory resident in the CPU for storing instructions;
   instructions stored in the random access memory for manipulating the input transmitter data to arrive at further transmitter characteristics and whereby the instructions cause the further transmitter characteristics to be automatically generated from the input transmitter characteristics;
   a modulation and scaling factor database connected to the CPU for storing information on transmitter modulation and associated scaling factors;
   a communication factor database for storing factors relating to a desired communications link; and
   output means for presenting the transmitter characteristics to an analyst.

14. The system for autoscaling transmitter characteristics wherein the system is incorporated into a satellite system analysis computer program for design selection of claim 13 wherein the input means is a keyboards.

15. The system for autoscaling transmitter characteristics wherein the system is incorporated into a satellite system analysis computer program for design selection of claim 13 wherein the input means is a voice recognition system.

16. The system for autoscaling transmitter characteristics wherein the system is incorporated into a satellite system analysis computer program for design selection of claim 13 wherein the modulation and scaling factor database further comprises at least a plurality of transmitter modulation types and a scaling factor associated with each transmitter modulation types.

17. The system for autoscaling transmitter characteristics wherein the system is incorporated into a satellite system analysis computer program for design selection of claim 13 wherein the communication factor database further comprises at least a plurality of desired data rates, signal-to-noise ratios, bit-error-rates, and carrier-to-noise ratios.

18. The system for autoscaling transmitter characteristics wherein the system is incorporated into a satellite system analysis computer program for design selection of claim 13 wherein the instructions stored in the random access memory multiply the scaling factor by the desired data rate to determine the transmitter characteristics.

19. The system for autoscaling transmitter characteristics wherein the system is incorporated into a satellite system analysis computer program for design selection of claim 18 wherein the automatically scaled transmitter characteristics comprise at least bandwidth.

20. The system for autoscaling transmitter characteristics wherein the system is incorporated into a satellite system analysis computer program for design selection of claim 13 wherein the output means is a hard copy selected from the group consisting of maps, reports and graphs.

21. The system for autoscaling transmitter characteristics wherein the system is incorporated into a satellite system analysis computer program for design selection of claim 13 wherein the output means is a video display for displaying output selected from the group consisting of animated output, maps, reports, and graphs.

\* \* \* \* \*